(12) United States Patent
Green

(10) Patent No.: US 6,405,645 B1
(45) Date of Patent: Jun. 18, 2002

(54) MARINATING APPARATUS

(76) Inventor: Donald T. Green, 132 E. Scott St., Long Beach, CA (US) 90805

( * ) Notice: Subject to any disclaimer, the term of this patent is extended or adjusted under 35 U.S.C. 154(b) by 0 days.

(21) Appl. No.: 10/014,213

(22) Filed: Nov. 9, 2001

(51) Int. Cl.[7] ............................. A23L 1/00; A23L 3/18; A47J 27/16; A22C 9/00
(52) U.S. Cl. ........................... 99/468; 99/331; 99/342; 99/345; 99/472; 99/483; 99/516; 99/486
(58) Field of Search .......................... 99/327–333, 342, 99/345–347, 467, 468, 472, 483, 485–487, 516, 534–536; 452/141; 366/131, 135, 139; 62/64, 346, 374; 219/401, 411, 438; 392/416; 426/281, 524, 650, 652, 442, 231, 506

(56) References Cited

U.S. PATENT DOCUMENTS

| | | | | |
|---|---|---|---|---|
| 63,772 | A | * 4/1867 | Whhitney | .................... 99/410 |
| 1,276,749 | A | * 8/1918 | George | .................. 126/369 X |
| 2,188,563 | A | * 1/1940 | Anzalone | .................... 99/413 |
| 3,928,634 | A | 12/1975 | Gasbarro | |
| 4,012,808 | A | 3/1977 | Strong | |
| 4,053,280 | A | * 10/1977 | Salisbury | ................ 134/135 X |
| 4,265,766 | A | * 5/1981 | Crossley | .................. 210/474 X |
| 4,574,776 | A | * 3/1986 | Hidle | ........................ 99/413 X |
| 4,604,989 | A | * 8/1986 | Kita | ............................. 99/413 |
| 4,818,550 | A | 4/1989 | Davidson | |
| 5,057,332 | A | 10/1991 | Davidson et al. | |
| 5,174,195 | A | 12/1992 | Anderson | |
| 5,363,751 | A | * 11/1994 | Prestigiacomo | ........... 99/450 X |
| D355,564 | S | 2/1995 | Dornbush et al. | |
| 6,007,418 | A | * 12/1999 | Suhner | ...................... 99/472 X |
| 6,105,490 | A | * 8/2000 | Horn et al. | .................... 99/472 |
| 6,279,328 | B1 | * 8/2001 | Leeds | ............................. 62/64 |
| 6,310,325 | B1 | * 10/2001 | Colburn | .................... 99/339 X |

* cited by examiner

Primary Examiner—Timothy F. Simone

(57) ABSTRACT

A marinating apparatus for marinating food products to induce flavoring agents into food products. The marinating apparatus includes a housing with a marinating compartment that has motorized supports for supporting a perforated food tray that permits the user to raise and lower the food in and out of the marinade. A heating element for warming the food, along with the necessary controls for activating it. A vacuum pump for evacuating the air from the marinating compartment and the associated controls. A timer device for controlling the process.

14 Claims, 2 Drawing Sheets

MARINATING APPARATUS

BACKGROUND OF THE INVENTION

1. Field of the Invention

The present invention relates to marinating machines and more particularly pertains to a new marinating apparatus for marinating food products to induce flavoring agents into food products.

2. Description of the Prior Art

The use of marinating machines is known in the prior art. U.S. Pat. No. 4,012,808 describes a device for enhancing the pickup of marinade by poultry. Another type of marinating machines is U.S. Pat. No. 5,057,332 having an apparatus and process for marinating foodstuffs.

While these devices fulfill their respective, particular objectives and requirements, the need remains for a device that includes has certain improved features such as a heating element for warming the food with electronic controls and a timer mechanism.

SUMMARY OF THE INVENTION

The present invention meets the needs presented above by use of a housing design that includes a heating element with electronic controls and a timer mechanism, along with a way of electrically lowering the food into the marinade.

Still yet another object of the present invention is to provide a new marinating apparatus that a display device that permits the user to monitor the process.

Even still another object of the present invention is to provide a new marinating apparatus that has an appealing design for use in a standard household.

To this end, the present invention generally comprises a housing with a marinating compartment that has motorized supports for supporting a perforated food tray that permits the user to raise and lower the food in and out of the marinade. A heating element for warming the food, along with the necessary controls for activating it. A vacuum pump for evacuating the air from the marinating compartment and the associated controls. A timer device for controlling the process.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
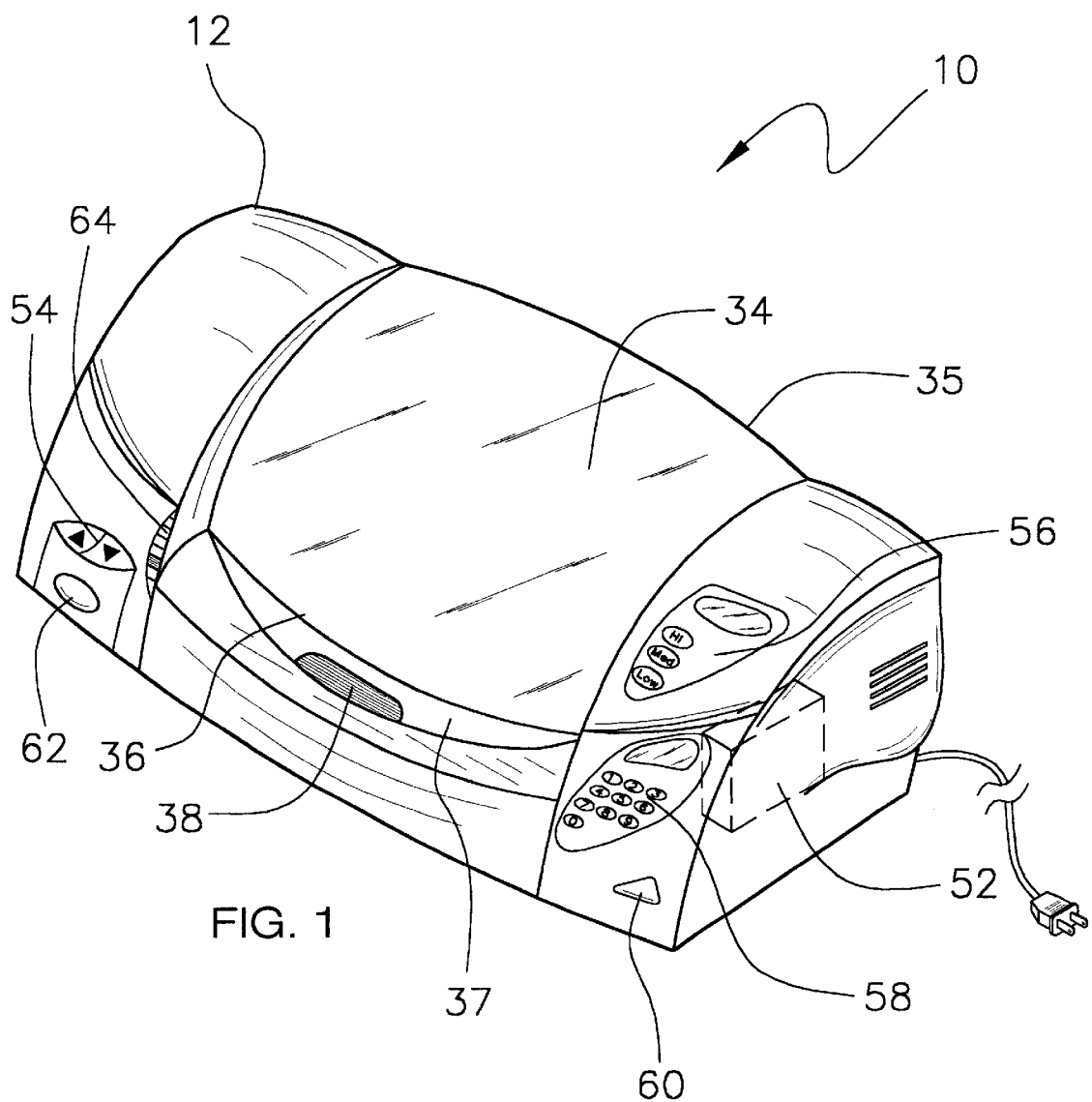
FIG. 1 is a schematic perspective view of a new marinating apparatus according to the present invention.
Figure 2:
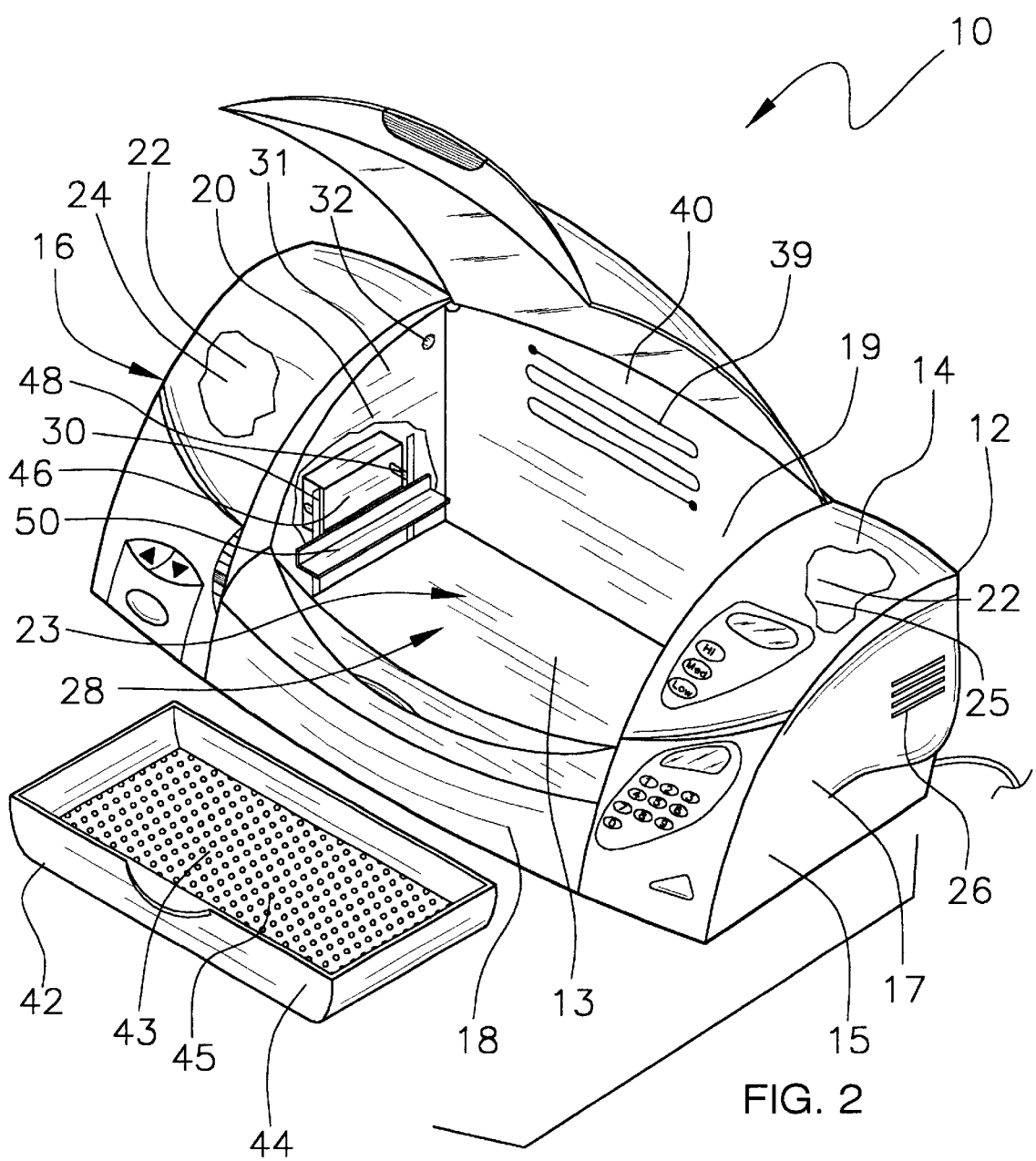
FIG. 2 is a schematic perspective view of the present invention showing the marinating compartment and the food tray.

With reference now to the drawings, and in particular to FIGS. 1 through 2 thereof, a new marinating apparatus embodying the principles and concepts of the present invention and generally designated by the reference numeral 10 will be described.

As best illustrated in FIGS. 1 through 2, the marinating apparatus 10 generally comprises a housing 12 that has a base wall 13 and a top wall 14 with a peripheral wall 15 extending between and being integrally coupled to the base and top wall 14s 13, 14. The peripheral wall 15 includes a first side wall 16, a second side wall 17, a front wall 18, and a back wall 19.

A pair of intermediate walls 20 divides the housing 12 into a pair of outer compartments 22 and a middle compartment 23. A first of the outer compartments 22 is adjacent to the first side wall 16. A second of the outer compartments 22 is adjacent to the second side wall 17.

Each of the outer compartments 22 has a vent 26 therethrough for equalizing pressure between the middle compartment 23 and the respective outer compartments 24, 25. The middle compartment 23 has an opening 28 in the top wall 14.

Each of the intermediate walls 20 has a plurality of vertical slots 30 that extend therethrough. A first of the intermediate walls 31 has a vacuum port 32 therein and positioned nearer the top wall 14 than the base wall 13.

A lid 34 encloses the middle compartment 23 and has a rear edge 35 and a front edge 36. The rear edge 35 is hingably coupled to the housing 12. A shape of the lid 34 conforms to the opening 28 such that the lid 34 generally seals the middle compartment 23 when the front edge 36 abuts the housing 12.

A lip portion 37 is attached to the front edge 36 forming a handle 38 for grasping onto by a user for selectively raising and lowering the lid 34.

A heating element 39 for warming the middle compartment 23 is positioned in the middle compartment 23 and attached to an inner surface 40 of the back wall 19.

A tray 42 for supporting the food products has a bottom surface 43 and a peripheral surface coupled to and extending upwardly from the bottom surface 43. The bottom surface 43 has a plurality of perforations 45 therethrough.

A lifting means is positioned in each of the outer compartments 22. The lifting means includes a motor 46, and a plurality of drive shafts 48 coupled to the motor 46. The drive shafts 48 extend through the slots and are positioned relatively adjacent to the motor 46. The motor 46 may selectively move the drive shafts 48 between a raised position spaced from the bottom wall, and a lowered position adjacent to the bottom wall.

A support member 50 for supporting the tray 42 is attached to the drive shafts 48.

A vacuum pump 52 for withdrawing air through the vacuum port 32 from the middle chamber when fully enclosed by the lid 34 is fixedly coupled to the base wall 13 and positioned in the second outer compartment.

A pair of positioning switches 54 for activating the moving means is attached to the top wall 14 of the first compartment and is operationally coupled to the motor 46.

A vacuum control device 56 for activating the vacuum pump 52 is attached to the top wall 14 of the second compartment and is operationally coupled to the vacuum pump 52.

A timer device 58 for permitting the user to time processing is attached to the top wall 14 of the second compartment.

A heat switch 60 for controlling the heater element is attached to the top wall 14 of the second compartment and is operationally coupled to the heating element 39.

A first indicator light 62 for displaying the status of the process is attached to the top wall 14 of the first compartment 24 and is operationally coupled to the timer device 58.

A second indicator light 62 for displaying the position of the tray 42 in the middle compartment 23 is attached to the top wall 14 of the first compartment 24 and is operationally coupled to the motor 46.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A marinating apparatus for marinating food products to induce flavoring agents into the food products, said apparatus comprising:
   a housing having a base wall and a peripheral wall extending between and being integrally coupled to said base and top walls, said peripheral wall including a first side wall, a second side wall, a front wall, and a back wall, a pair of intermediate walls dividing said housing into a pair of outer compartments and a middle compartment;
   a lid for enclosing said middle compartment having a rear edge and a front edge, said rear edge being hingably coupled to said housing, a shape of said lid conforming to said opening such that said lid generally seals said middle compartment when said front edge is abutting said housing;
   a heating element for warming said middle compartment being positioned in said middle compartment and attached to an inner surface of said back wall;
   a tray for supporting the food products having a bottom surface and a peripheral surface coupled to and extending upwardly from said bottom surface, said bottom surface having a plurality of perforations therethrough;
   a lifting means being positioned in each of said outer compartments;
   a vacuum pump for withdrawing air through said vacuum port from said middle chamber when fully enclosed by said lid being fixedly coupled to said base wall and positioned in said second outer compartment;
   a pair of positioning switches for activating said moving means being attached to said top wall of said first compartment being operationally coupled to said motor;
   a vacuum control device for activating said vacuum pump being attached to said top wall of said second compartment being operationally coupled to said vacuum pump;
   a timer device for permitting the user to time processing being attached to said top wall of said second compartment;
   a heat switch for controlling said heater element being attached to said top wall of said second compartment being operationally coupled to said heating element;
   a first indicator light for displaying the status of the apparatus being attached to said top wall of said first compartment and being operationally coupled to said timer device; and
   a second indicator light for displaying the position of said tray in said middle compartment being operationally coupled to said motor.

2. The marinating apparatus as set forth in claim 1, wherein a first of said outer compartments being adjacent to said first side wall, a second of said outer compartments being adjacent to said second side wall.

3. The marinating apparatus as set forth in claim 1, further including each of said outer compartments having a vent therethrough for equalizing pressure between said middle compartment and the respective outer compartments.

4. The marinating apparatus as set forth in claim 1, further comprising said middle compartment having an opening in said top wall.

5. The marinating apparatus as set forth in claim 1, further comprising each of said intermediate walls having a plurality of vertical slots extending therethrough.

6. The marinating apparatus as set forth in claim 1, further comprising a first of said intermediate walls having a vacuum port therein and positioned nearer said top wall than said base wall.

7. The marinating apparatus as set forth in claim 1, further comprising a lip portion being attached to said front edge forming a handle for grasping onto by a user for selectively raising and lowering said lid.

8. The marinating apparatus as set forth in claim 1, wherein said lifting means including a motor.

9. The marinating apparatus as set forth in claim 1, wherein said lifting means including a plurality of drive shafts being coupled to said motor and extending through said slots and positioned relatively adjacent to said motor.

10. The marinating apparatus as set forth in claim 9, wherein said motor may selectively move said drive shafts between a raised position spaced from said bottom wall and a lowered position adjacent to said bottom wall.

11. The marinating apparatus as set forth in claim 9, wherein said lifting means including a support member for supporting said tray being attached to said drive shafts.

12. The marinating apparatus as set forth in claim 1, further including a first indicator light for displaying the status of the apparatus being attached to said top wall of said first compartment and being operationally coupled to said timer device.

13. The marinating apparatus as set forth in claim 1, further including a second indicator light for displaying the position of said tray in said middle compartment being attached to said top wall of said first compartment and being operationally coupled to said motor.

14. A marinating apparatus for marinating food products to induce flavoring agents into the food products, said apparatus comprising:
   a housing having a base wall and a peripheral wall extending between and being integrally coupled to said base and top walls, said peripheral wall including a first side wall, a second side wall, a front wall, and a back wall, a pair of intermediate walls dividing said housing into a pair of outer compartments and a middle compartment, a first of said outer compartments being adjacent to said first side wall, a second of said outer compartments being adjacent to said second side wall, each of said outer compartments having a vent therethrough for equalizing pressure between said middle compartment and the respective outer compartments, said middle compartment having an opening in said top wall, each of said intermediate walls having a plurality of vertical slots extending therethrough, a first of said intermediate walls having a vacuum port therein and positioned nearer said top wall than said base wall;

a lid for enclosing said middle compartment having a rear edge and a front edge, said rear edge being hingably coupled to said housing, a shape of said lid conforming to said opening such that said lid generally seals said middle compartment when said front edge is abutting said housing, a lip portion being attached to said front edge forming a handle for grasping onto by a user for selectively raising and lowering said lid;

a heating element for warming said middle compartment being positioned in said middle compartment and attached to an inner surface of said back wall;

a tray for supporting the food products having a bottom surface and a peripheral surface coupled to and extending upwardly from said bottom surface, said bottom surface having a plurality of perforations therethrough;

a lifting means being positioned in each of said outer compartments, said lifting means including;
- a motor, a plurality of drive shafts being coupled to said motor and extending through said slots and positioned relatively adjacent to said motor, wherein said motor may selectively move said drive shafts between a raised position spaced from said bottom wall and a lowered position adjacent to said bottom wall;
- a support member for supporting said tray being attached to said drive shafts;

a vacuum pump for withdrawing air through said vacuum port from said middle chamber when fully enclosed by said lid being fixedly coupled to said base wall and positioned in said second outer compartment;

a pair of positioning switches for activating said moving means being attached to said top wall of said first compartment being operationally coupled to said motor;

a vacuum control device for activating said vacuum pump being attached to said top wall of said second compartment being operationally coupled to said vacuum pump;

a timer device for permitting the user to time processing being attached to said top wall of said second compartment;

a heat switch for controlling said heater element being attached to said top wall of said second compartment being operationally coupled to said heating element;

a first indicator light for displaying the status of the apparatus being attached to said top wall of said first compartment and being operationally coupled to said timer device; and a second indicator light for displaying the position of said tray in said middle compartment being attached to said top wall of said first compartment and being operationally coupled to said motor.

* * * * *